(12) United States Patent
Schulz

(10) Patent No.: US 10,803,903 B2
(45) Date of Patent: *Oct. 13, 2020

(54) METHOD FOR CAPTURING AND RECORDING HIGH-DEFINITION VIDEO AND AUDIO OUTPUT AS BROADCAST BY COMMERCIAL STREAMING SERVICE PROVIDERS

(71) Applicant: Modulus Media Systems, Inc., Austin, TX (US)

(72) Inventor: Steven E. Schulz, Austin, TX (US)

(73) Assignee: Modulus Media Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,579

(22) Filed: Jun. 17, 2019

(65) Prior Publication Data

US 2019/0304504 A1    Oct. 3, 2019

Related U.S. Application Data

(63) Continuation of application No. 15/846,973, filed on Dec. 19, 2017, now Pat. No. 10,354,690.

(Continued)

(51) Int. Cl.
| | |
|---|---|
| *G06T 1/60* | (2006.01) |
| *G06F 9/445* | (2018.01) |
| *H04N 5/76* | (2006.01) |
| *G11B 20/10* | (2006.01) |
| *H04L 29/08* | (2006.01) |
| *G06F 9/448* | (2018.01) |
| *H04N 9/804* | (2006.01) |

(52) U.S. Cl.
CPC ........ *G11B 20/10527* (2013.01); *G06F 9/445* (2013.01); *G06T 1/60* (2013.01); *H04N 5/76* (2013.01); *G06F 9/4484* (2018.02); *G11B 2020/10675* (2013.01); *H04L 67/02* (2013.01); *H04N 9/8042* (2013.01)

(58) Field of Classification Search
CPC ........ G06F 9/445; H04N 5/76; H04N 9/8042; H04L 67/02
See application file for complete search history.

(56) References Cited

U.S. PATENT DOCUMENTS

2017/0039050 A1*  2/2017  Eltsin ................. G06F 9/44521

* cited by examiner

*Primary Examiner* — Thai Q Tran
*Assistant Examiner* — Jose M Mesa
(74) *Attorney, Agent, or Firm* — DuBois, Bryant & Campbell, LLP; William D. Wiese

(57) ABSTRACT

Methods and systems for recording streaming audio and video by directing an incoming audio-visual stream to a discrete memory region serving as a virtual display. The virtual display is configured with a section visible to the viewer and a section invisible to the viewer, wherein a streaming video is hidden from the user's display under all conditions. The user's browser is pre-loaded with hooks to redirect the video portion of the stream to the invisible section of the virtual memory wherein a video capture tool specifically designed to interact with the hooks can now recognize each function call and intercept each frame as it is rendered in the GPU. Concurrently, the audio portion of the stream is remapped using an audio indexing application. The GPU framebuffers and audio sinks are multiplexed together and saved to disk. The file is immediately accessible for playback or copying.

5 Claims, 3 Drawing Sheets

Related U.S. Application Data

(60) Provisional application No. 62/435,932, filed on Dec. 19, 2016.

METHOD FOR CAPTURING AND RECORDING HIGH-DEFINITION VIDEO AND AUDIO OUTPUT AS BROADCAST BY COMMERCIAL STREAMING SERVICE PROVIDERS

PRIORITY STATEMENT UNDER 35 U.S.C. § 119 & 37 C.F.R. § 1.78

This non-provisional application is a continuation of U.S. patent application Ser. No. 15/846,973 filed Dec. 19, 2017, in the name of Steven E. Schulz entitled "METHOD FOR CAPTURING AND RECORDING HIGH-DEFINITION VIDEO AND AUDIO OUTPUT AS BROADCASE BY COMMERCIAL STREAMING SERVICE PROVIDERS" which claims priority based upon prior U.S. Provisional Patent Application Ser. No. 62/435,932 filed Dec. 19, 2016, in the name of Steven E. Schulz entitled "METHODS AND SYSTEMS FOR VIDEO STORAGE AND PLAYBACK," the disclosures of which are incorporated herein in their entirety by reference as if fully set forth herein.

FIELD OF INVENTION

This invention relates to a method and system for recording audio and video and, more specifically, for recording audio and video as it is being streamed to a computer.

BACKGROUND

Commercial internet streaming services deliver web-based audio and video (A/V) content using encrypted, encoded, multiplexed streams. For playback within a web browser for home PC use, the stream will typically use an HTML5-based web protocol. Because the audio/video content is encrypted and protected by digital rights management (DRM) when it arrives, one of several DRM decryption technologies known in the art, such as WideVine, are employed, where the shared portion of the technology is resident in the browser or operating system, and the vendor-specific implementation details are integrated as part of the internet connection and media stream. The secured connection, once authenticated between the provider's server and the user's browser, then enables the content to be decrypted in real time with continuous decryption authentication.

As the stream includes a real time, bidirectional authentication protocol, it is not possible to use a saved media stream from the internet connection for time-shifting (re-cording) of authorized media content.

The process of audio/video playback through the browser involves several discrete steps. First, the encoded, encrypted stream is decrypted using the method described above. Second, the decrypted stream must then be decoded, using either accelerated graphics processing unit (GPU) hardware or general-purpose CPU resources. The decrypted, decoded video stream data is next passed securely to the GPU for rendering the video stream into mapped pixels for the display device. The rendering process generates a bit stream for each video frame, mapped to the video memory associated with the current display device. The contents of the memory-mapped video region are directly visible to the user as each frame is rendered. For less-intensive audio decoding, the set of audio tracks, which generally number between two and eight, generally use CPU resources, with the resulting audio streams being temporally synchronized with the video stream at the point of rendering. The audio streams are sent to the PC's audio hardware for direct output from the PC.

The ability to capture a screenshot using PC software is commonplace and uses few central processing unit (CPU) resources. To capture video in real-time, however, compromises must generally be made to manage the extreme demands on the CPU. Such compromises include capturing only a region of the display and/or decreasing the display's video resolution, lowering the frame rate for capture, and/or using a smaller color palette profile. Generally, audio is not well synchronized and is discarded or, in some cases, even ignored.

Practical computational limits aside, the capture method above also demands that the user's display (and audio output, if captured at all) be consumed with this process for the duration of the capture. This precludes the possibility of recording in background, a prerequisite for any "DVR" type of functionality. The solution to background, high definition-quality recording or video and audio requires more than basic PC capture software can provide.

There is a need, therefore, for a method and system for capturing and recording high definition video and audio output broadcast by commercial streaming providers that do not require capturing only a region of the display, decreasing the display's video resolution, lowering the frame rate for capture, using a smaller color palette profile, or discarding audio.

SUMMARY OF THE INVENTION

Methods and systems are disclosed for recording streaming audio and video. A user enters a URL that directs the web browser to an internet streaming site where the user typically provides access credentials. The user selects the desired content and requests playback through the computer. Before starting the A/V stream, a region of the computer's memory is allocated to facilitate the recording. The incoming A/V stream is directed to this memory region, which serves as a virtual display, as if it was the primary display. This virtual display is an extension of the primary display and is divided into a section that is visible to the viewer and a section that is invisible to the viewer. This enables a video in full-screen playback mode to be fully hidden from the user's display under all conditions.

Prior to recording, a special shared-object library, which includes a set of hooks that make the GPU function calls accessible, is pre-loaded with the web browser. A video capture tool specifically designed to interact with the hooks can now recognize each function call, and intercept each frame as it is rendered in the GPU hardware.

The incoming video stream is first decrypted, decoded and DRM managed, and then remapped to the invisible section of the virtual display where it is captured using access to the GPU's browser-level framebuffers. Concurrently, the audio is also remapped using an audio indexing application that detects and identifies the appropriate audio streams for the given video stream and remaps those streams to specially-created sinks that can be used by the video capture software as a replacement for the normal audio sinks. The GPU framebuffers and audio sinks are captured, processed, compressed, and multiplexed together, and saved to disk. The saved disk file is immediately accessible for playback or copying. In some embodiments, the saved disk file is further compressed, creating a second file that replaces the first when completed.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
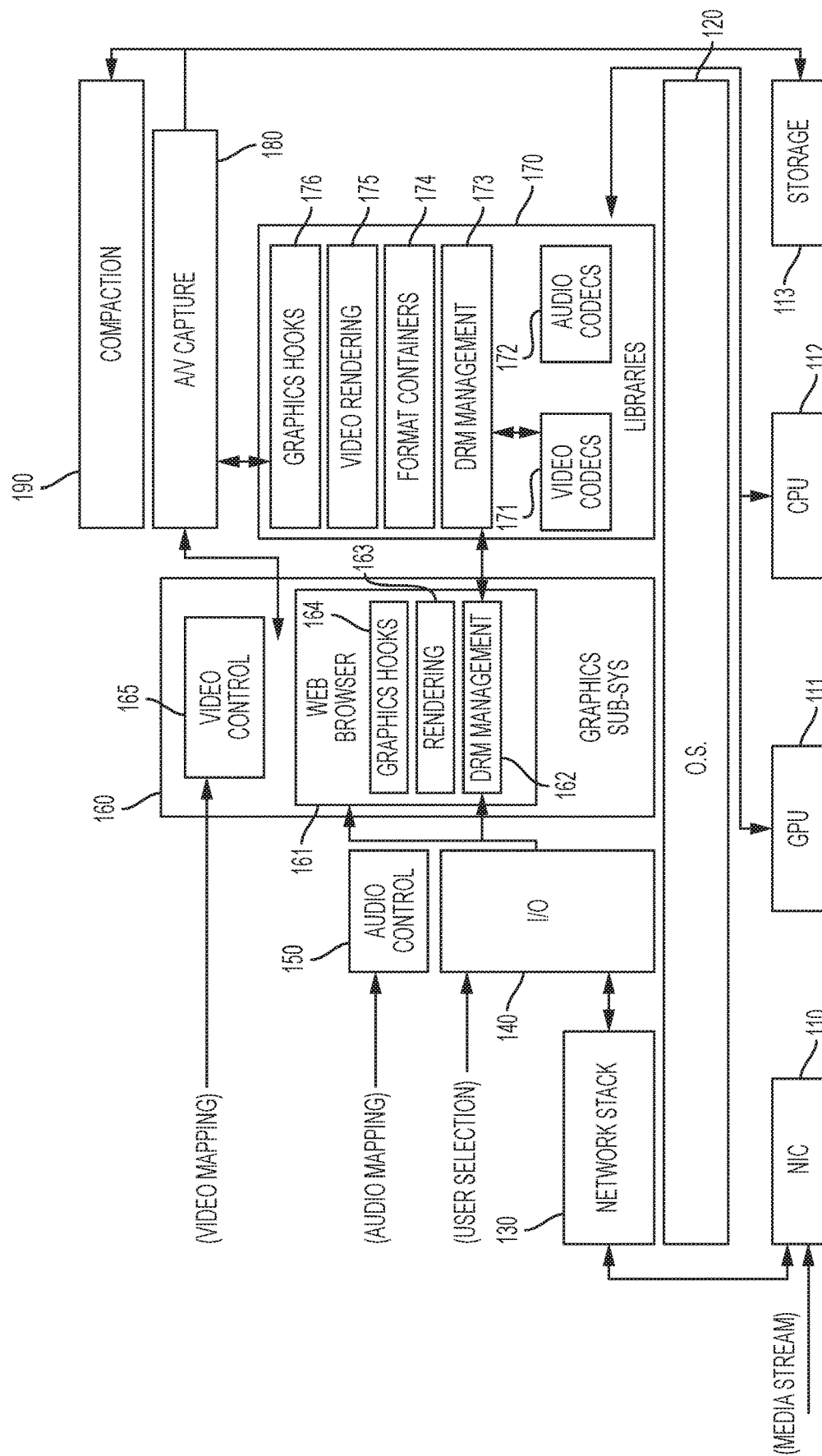
FIG. 1 is an architecture block diagram showing the various components involved in one embodiment of the present invention.

The present invention is directed to improved methods and systems for, among other things, video storage and playback. The configuration and use of the presently preferred embodiments are discussed in detail below. It should be appreciated, however, that the present invention provides many applicable inventive concepts that can be embodied in a wide variety of contexts other than video storage and playback. Accordingly, the specific embodiments discussed are merely illustrative of specific ways to make and use the invention, and do not limit the scope of the invention. In addition, the following terms shall have the associated meaning when used herein:

"computer" or "PC" means any computer in stationary, mobile or wearable format, a mobile phone or any other device with an operating system capable of running a web browser;

"display" means a TV monitor, TV screen, computer monitor, computer screen, desktop display, broadcast monitor, broadcast video monitor, broadcast reference monitor or other display device used to monitor the output of a video-generating device;

"hook" means a segment of code that alters or augment the behavior of an operating system, of applications, or of other software components by intercepting function calls or messages or events passed between software components;

"streaming" means the electronic delivery of digital video and/or audio content to a user over the Internet. With streaming content, the user does not have to download the entire digital video or digital audio file before they start to play it.

"web browser" means a software application for retrieving, presenting and traversing uniform resource locators (URLs) on the World Wide Web.

As will be apparent to those skilled in the art, many of the methods and systems depicted herein are without each and every component required for full functionality. In each case the depiction is intended to show the functional aspects of the method or device for a better understanding of the invention and should not necessarily be construed as including all of the elements of a fully operational device.

To accomplish background recording, various embodiments of the present invention rely on a combination of three simultaneous techniques. First, a region of the computer's memory is allocated to the recording. The browser engine, decryption technology, and renderer will direct the designated A/V stream to this memory region, which serves as a virtual display, as if it was the primary display. The size of this virtual display can be designated by the user, but cannot cause the resolution of the image to fall below the desired threshold. In some embodiments, this virtual display is created using an extension of the primary display.

For example, an original 1920×1080 pixel primary display is extended by a factor of four to create a 3840×2160 pixel virtual display. However, the size of the primary display visible region is restricted to the original 1920×1080 pixel section in one quadrant of the virtual display, and the size of the new invisible (to the viewer) region is similarly restricted to a 1920×1080 pixel section in a separate quadrant of the virtual display. Using these two restricted sections—one visible and one invisible—of the virtual display, bypasses the barrier of sizing, moving and mapping a full-screen playback window. The result enables a video in full-screen playback mode to be fully hidden from the user's display under all conditions.

Second, a special shared-object library is pre-loaded when the web browser is invoked. This library injects a set of hooks that make the normally private GPU function calls and shared memory space of the web browser's video frames externally accessible. The pre-loaded library, as with other shared libraries loaded by the web browser, must be co-resident in the same process space. In conjunction with this shared-object library, a video capture tool specifically designed to interact with those injected hooks can now recognize each hardware-accelerated graphics call, and intercept each frame as it is rendered in the GPU hardware. This upstream capture of frames directly out of the GPU's framebuffer specific to the web browser application has multiple advantages over downstream capture of a fully-composited display region under window manager control. The advantages include: (1) the risk of tearing or flicker is eliminated; (2) frames cannot be skipped or captured twice; (3) aggregate CPU utilization is substantially lower and more efficient; (4) movement of the application's window becomes irrelevant; and (5) no other windows, notifications, or overlays can impact the stream recording.

Third, while the video component of the stream is being remapped to the virtual display, the audio must also be remapped away from the main output. In various embodiments, an audio indexing application known in the art, such as PulseAudio, creates an indexed set of defined sources, sinks, applications, and streams in real-time as they are created and destroyed. The matrix of mappings uses profiles to determine how to map between them. The key is to programmatically detect and identify the appropriate audio streams, or tracks, for the given video stream, then remap those streams to specially-created sinks that can be used by the video capture software as a replacement for the normal audio sinks.

To address the HD-quality encoding barrier, there are several technical methods used. First, numerous technical encoding parameters are very carefully optimized to match both the nature of the streaming video content and the hardware. Second, the real-time encoding phase uses the GPU instead of relying on all CPU resources. Third, the encoding is performed directly on the upstream GPU-rendered frames, before these frames have been composited onto the display using a window manager, which avoids redundant graphics calls and provides other advantages as described above. Fourth, in some embodiments, a portion of the file format compression effort is off-loaded from capture (real-time) to a batch post-capture phase (same MP4 format and quality, but smaller disk footprint).

As can be appreciated by one of skill in the art, the flow sequence of capturing and recording streaming A/V is an important element of the process. In one embodiment of the present invention, the flow sequence may be represented as follows:

1. A special shared-object library is pre-loaded with the web browser to inject a set of hooks that make the normally private GPU function calls and shared memory space of the browser's video frames externally accessible;
2. The user enters a URL that directs the web browser to an internet streaming site where the user provides access credentials;
3. The user selects the desired content and requests playback;
4. An encrypted, compressed stream of content is delivered to the computer through the web browser;
5. The decryption technology is authorized, and the content begins streaming;
6. A new video memory region having both a visible section and an invisible section is created to host a virtual display;
7. Audio sources, sinks and streams are identified and remapped;
8. The recording program recognizes the special graphics hooks in the shared-object library to determine playback resolution and frame rate;
9. The video is directed to the invisible section of the video memory region where it is captured using access to the GPU's browser-level framebuffers;
10. The GPU framebuffers and audio sinks are captured, processed, compressed, and multiplexed together, and saved to disk;
11. Upon detection of the completion event, the browser window, capture software, extended video region, and audio remappings are removed or restored to the original state;
12. The saved disk file is immediately accessible for playback or copying; and
13. In some embodiments, additional the saved disk file is further compressed, creating a second file that replaces the first when completed.

Referring now to FIG. 1, which shows the system architecture of one embodiment of the present invention. The lowest layer depicts the hardware components of the device, including a network interface card (NIC) 110, graphics processing unit (GPU) 111, and central processing unit (CPU) 112. Persistent storage 113, for example, one or more disk drives, is shown at the lower right.

The second level in the system architecture is the operating system 120, running directly on the hardware and including drivers that communicate with the hardware.

On top of the operating system 120 are a number of software resources. The network stack 130 provides a logical connection with the network interface card 110. The I/O sub-system 140 handles input and output events. In some embodiments an audio control block 150 manages the connection of a matrix of audio sources and sinks, and can be programmatically re-configured.

The graphics sub-system 160 manages video and display events, and hosts all graphical applications and windows (such as the web browser). The browser engine 161 includes graphics hooks 164 for DRM management 162 using, for example, the "WideVine" DRM protection standard, popular in many browsers and used by many internet services, such as Netflix. The configuration of the display can be dynamically reconfigured using video controls that enable changes to resolution, the creation of virtual displays, and so on.

At the right side of the system architecture are numerous libraries 170 of functions used by the operating system and/or other subsystems and applications. Video codecs 171 and audio codecs 172 provide functions to encode or decode (compress or expand) media streams. The browser DRM graphics hooks 176 rely on embedded DRM management 173 in the shared library of the DRM application. Software that reads or creates media files need to understand various format containers 174 that provide an identifying or organizing wrapper for multiple encoded audio or video streams in a media file. Another library provides video rendering 175, by passing video data to the GPU 111 for pixelization that is sent to a defined video memory region use by the display device.

On top of the libraries 170, an A/V capture utility 180 saves a specified frame-by-frame video region, and specified set of audio streams, into an encoded media file on the storage 113. Another compaction program 190 reads that media file and further compresses the encoded information for improved on-disk efficiency.

At lower left, the NIC 110 provides bidirectional communication with a media stream over the internet (specifically, from a streaming service provider), using IP v4 or v6 protocol. The stream is authorized for decryption by a DRM management application, then the video and audio is decoded, rendered, and saved to disk as per the narrative above.

Figure 2:
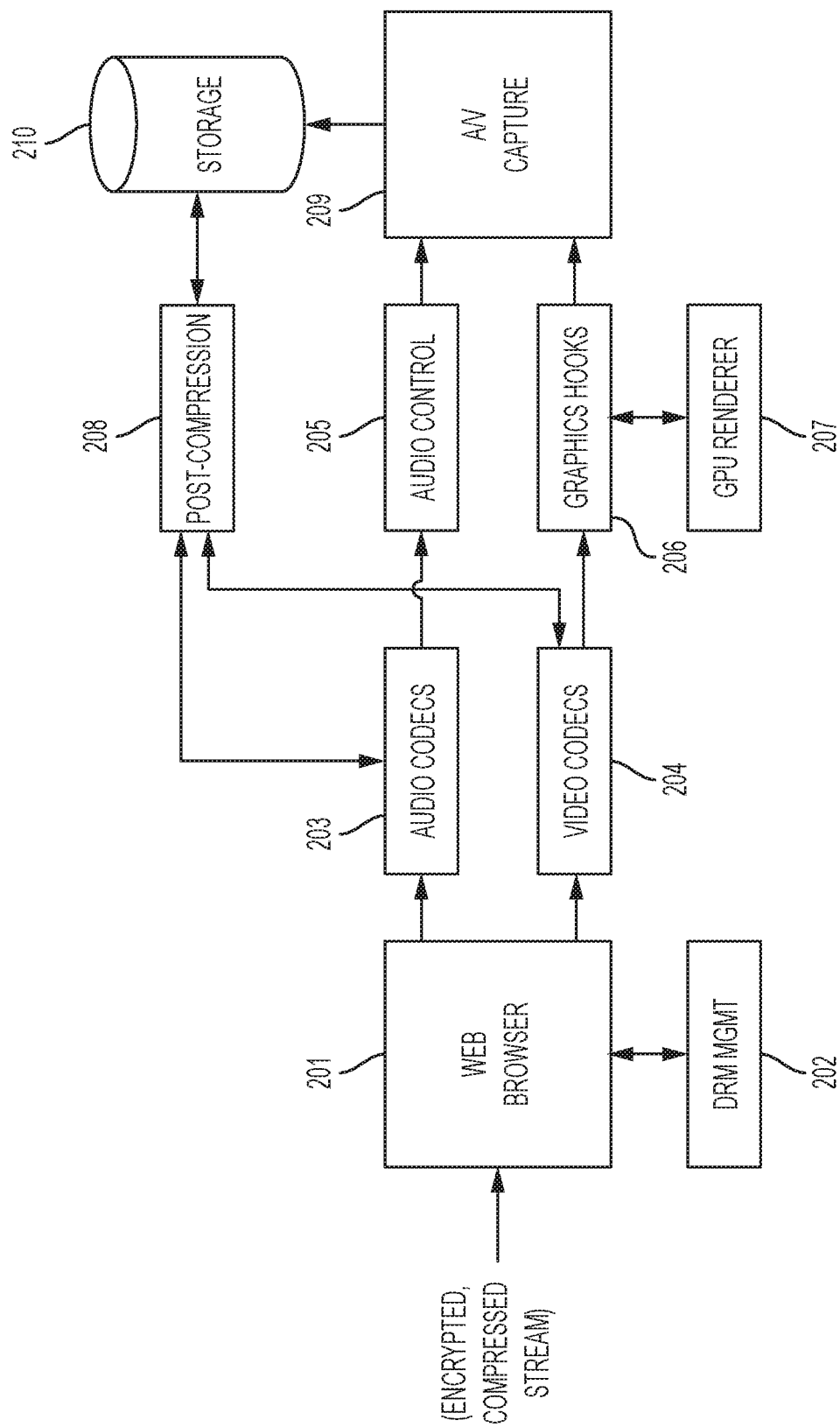
FIG. 2 is a signal flow diagram illustrating the flow of information between the blocks of FIG. 1.

Referring now to FIG. 2, which illustrates the flow of information between the components of the system architecture. An encrypted, encoded, compressed media stream begins under the control of the browser 201, which authenticates the stream with the user's login credentials using DRM management libraries 202, approved for use by the service provider, to permit the stream to be decoded, decrypted/and decompressed. Decryption occurs through the DRM management library 202. Next, the decrypted data stream is passed to audio 203 and video 204 decompression libraries ("codecs"); the video codec library may optionally route the stream through dedicated GPU hardware to reduce the burden on the CPU. The decompressed audio streams (channels) are routed through an audio control sub-system 205, while the video stream is routed by the Graphics Hooks 206 to the GPU 207 for hardware-accelerated rendering into a pixel array matching the target resolution and frame rate. Using the pre-loaded shared library containing a set of graphics hooks, the calls to the GPU renderer 207 are intercepted, and the GPU shared memory holding each frame is made accessible so that it can be routed into the audio/video capture tool 209. The audio channels are also re-routed, away from the system's audible output, into a private audio sink (socket) that can be recognized by the audio/video capture tool.

Next, the audio/video capture program is activated to capture the audio output and compress it, and to capture the video output and compress it, multiplex the two streams into a single stream wrapped in one of numerous popular video format containers, such as .mkv or .mp4, and saved to storage 210. In some embodiments, after the recording is complete, a post-compression 208 task further reduces disk file size as a background task, and after successful completion, replaces the original saved file to storage 210.

Figure 3:
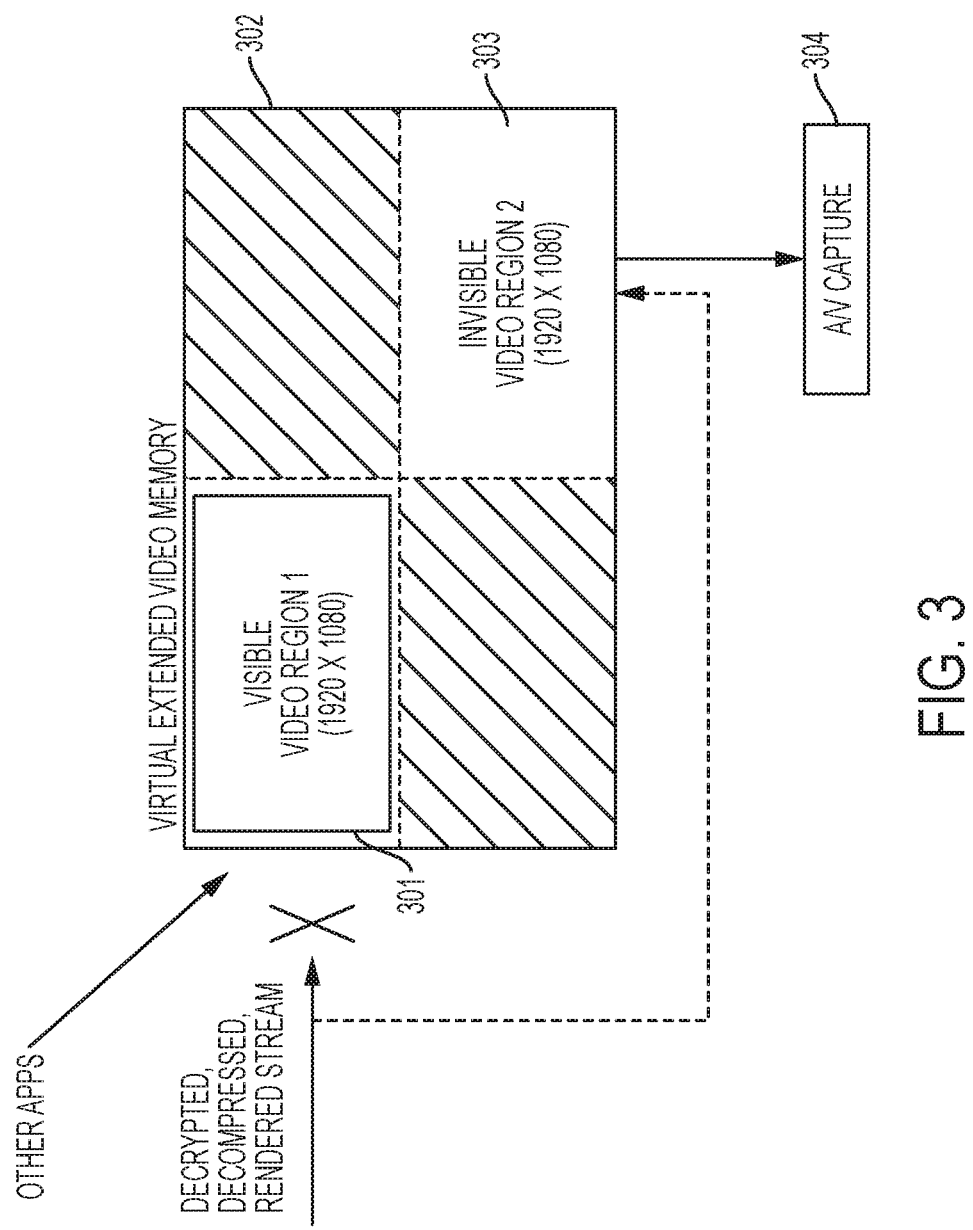
FIG. 3 is a video memory mapping diagram visualizing the mapping of a video memory regions works of one embodiment of the present invention.

Referring now to FIG. 3, the video memory region considers a range of contiguous memory addresses that store video pixel data, specifically intensity and color, for a given frame in the video sequence. That linear address range of data values per pixel is organized into an X-Y matrix, such as shown in the box labeled "Visible Video Region 1" 301. All rendered pixels are passed to the display each time the matrix of pixel data for the given frame is ready. The streaming service provider's full-screen playback expects the data to directly drive the display device.

However, the total video memory addressing region can be dynamically extended, as represented by the box labeled "Virtual Extended Video Memory" 302, which in this example is a factor of four larger than the primary display resolution. Now, the memory is subdivided to create two independent "virtual displays," each of which define its full-screen resolution to be identical to the initial resolution. This enables both the original region 301 and the newly-created region, labeled "Invisible Video Region 2" 303, to behave independently, with the same resolution, color depth, and frame rate characteristics.

Now, using this technique, any full-screen video playback targeting the visible region 301 can be transparently and dynamically relocated to the new, invisible region 303. The hosting application is unaware of this relocation. Finally, the software that records (captures) the video is directed to target "Invisible Video Region 2" 303 instead of "Visible Video Region 1" 301. All steps occur automatically in background, and the user may use the video and audio of the system for other functions without having any impact on the recording session. When complete, the invisible video memory region 303 is deleted, restoring the video memory to its original configuration, all in background while the visible video region continues to function normally.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for video storage and playback known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

We claim:

1. A method for capturing video, comprising:
   loading a shared-object library into a device's web browser, the shared-object library making a computer's graphics processing unit's function calls and the web browser's memory space accessible;
   receiving through the web browser a video stream having video content and audio content;
   decoding and rendering frames of video content through the graphics processing unit's function calls;
   capturing rendered video frames;
   passing captured video frames to a video capture tool;
   concurrently remapping the audio content to an audio sink to create an audio stream;
   synchronizing the audio content with the video content in the video capture tool;
   multiplexing the video frames with the audio stream as they are rendered in the video capture tool to create a copy of the original video stream; and
   saving the copy of the video stream to storage.

2. The method of claim 1, wherein the audio sink is independent of the device's active audio outputs.

3. The method of claim 1, wherein the incoming video stream is first decrypted and DRM managed before being remapped, rendered and saved to video storage.

4. The method of claim 1, wherein the copy of the video stream is compressed before it is saved to storage.

5. The method of claim 1, wherein a user can view a portion of the recorded video stream that is visible in a video player application while multiplexing takes place in the device's graphics processing unit.

\* \* \* \* \*